United States Patent [19]

Moeckel et al.

[11] 4,415,999
[45] Nov. 15, 1983

[54] METHOD OF CONFIRMING SEISMIC DATA INTERPRETATION

[75] Inventors: George P. Moeckel, Houston; George C. Wallick, Duncanville, both of Tex.

[73] Assignee: Mobil Oil Corporation, New York, N.Y.

[21] Appl. No.: 324,288

[22] Filed: Nov. 23, 1981

[51] Int. Cl.³ .............................................. G01V 1/30
[52] U.S. Cl. ...................................... 367/73; 367/56
[58] Field of Search .......................... 367/73, 56, 25; 324/339

[56] References Cited

U.S. PATENT DOCUMENTS

| | | | |
|---|---|---|---|
| 3,611,278 | 10/1971 | Guinzy et al. | 340/15.5 |
| 3,651,451 | 3/1972 | Ruehle | 340/15.5 |
| 3,671,929 | 6/1972 | Ruehle et al. | 340/15.5 |
| 4,293,933 | 10/1981 | Park et al. | 367/73 |
| 4,314,339 | 2/1982 | Kenyon | 324/339 |
| 4,330,873 | 5/1982 | Peterson | 367/73 |
| 4,375,090 | 2/1983 | Thompson et al. | 367/73 |

OTHER PUBLICATIONS

Tooley, Spencer and Sagoci (TSS), "Reflection and Transmission of Plane Compression Waves", *Geophysics*, vol. XXX, No. 4, pp. 552-570, (Aug. 1965).

*Primary Examiner*—Nelson Moskowitz
*Attorney, Agent, or Firm*—A. J. McKillop; M. G. Gilman; J. F. Powers, Jr.

[57] ABSTRACT

An improved method of generating synthetic seismograms for use in determining the accuracy of hypothesized subterranean structures is disclosed. The method features defining hypothesized detector locations corresponding to real detector locations rather than interpolating from arbitrary detector locations generated by specifying of initial ray path angles as input data. The accuracy of the results is improved by elimination of interpolation.

9 Claims, 5 Drawing Figures

PRIMARY RAY PATH THROUGH 3 LAYERS

METHOD OF CONFIRMING SEISMIC DATA INTERPRETATION

FIELD OF THE INVENTION

This invention relates to improved methods of determining the subterranean structure of the earth e.g., in connection with exploration for oil, gas and other minerals. More particularly, the invention relates to an improved method of generating a synthetic seismogram from a model of the subterranean structure of the earth for comparison with a real seismogram, whereby the correspondence between the real and the synthetic seismograms is an indication of the accuracy of correspondence between the model and the real structure.

BACKGROUND OF THE INVENTION

It has been known for many years to practice seismic exploration of the earth. For example, according to the "Vibroseis" method currently popular, acoustic energy is imparted to the earth at a first location. It will be understood that the term "acoustic" when used here and in the discussion that follows should be construed to include all possible types of wave propagation in the earth. The acoustic wave thus generated passes downwardly through the earth and is reflected from interfaces between rock layers of varying density to be retransmitted upwardly towards the surface of the earth. It is detected by a plurality of detectors, which are termed "geophones" when an exploration is performed on the surface of the earth or "hydrophones" when it is performed on the ocean. The present invention relates to both modes; use of the term "geophone" should therefore be construed to include "hydrophones", and so on, as indicated by the context. The records output by the geophones are typically analog waveforms showing relatively high amplitude peaks where the reflected burst is received by the detector. If a plurality of such records are corrected for the differing source-to-receiver distance and are printed side by side, the peaks will line up. This can be taken as an indication of the presence of an interface between rock layers. These pictures can then be used by the geophysicist in the location of subterranean formations likely to contain oil, gas or other valuable minerals. See, e.g., U.S. Pat. No. 3,611,278 to Guinzy and Ruehle.

It will be appreciated that in addition to true primary reflection events, the time of detection of which is indicative of the depth of an interface beneath the surface, events of less easily interpreted physical significance, e.g., after multiple reflections have taken place at rock layer interfaces, also occur. Accordingly, it is possible for a seismic record to be ambiguous or to be misinterpreted. Therefore, where this possibility is deemed to be present, it is known to derive a synthetic seismogram using ray tracing modeling techniques. The path of a wave comparable to that actually input to the earth is traced through a hypothesized subterranean structure in accordance with known laws of reflection and refraction such as Snell's law. In general the incident angle of the wave with respect to the earth's surface is varied and plural rays traced. The outputs of the arbitrarily selected input paths may then be interpolated to yield a synthetic seismogram comparable to a real seismogram, i.e., one having inputs determined by the physical location of geophones with respect to the source, which can then be compared with the real seismogram; the degree to which the synthetic seismogram matches the real is thus an indication of the accuracy of the model used.

As noted above, the typical ray tracing programs used in the prior art to generate synthetic seismograms for comparison with real seismograms to measure the accuracy of a model hypothesized generally require selection of downward-going ray paths in a first layer as the beginning of the ray tracing program. The ray traced eventually emerges from the earth some distance from the source. Since in real exploration practices, the output waves are detected at locations determined by the physical location of geophones with respect to the source, it is necessary to interpolate the output points of the rays traced to correspond to the positions of the actual geophones before the seismograms can be directly compared. Not only is this interpolation process costly of computer time but it is also possible that the interpolated results may not be valid. For example, it has been discovered that the output of a geophone does not vary simply as a function of the distance between the source and the receiver (the "offset"). Therefore, the use of interpolation as a means of generalizing specific output results to hypothetical geophone locations can lead to serious inaccuracies in the synthetic seismogram thus generated. U.S. Pat. No. 3,671,929 to Ruehle et al is an example of such a modeling process, in which initial angles of ray travel are specified, and the results interpolated to correspond to an actual seismogram; U.S. Pat. No. 3,651,451 to Ruehle described a method of estimating the velocity of an acoustic wave in a subterranean layer useful in the generation of such synthetic seismograms.

OBJECTS OF THE INVENTION

It is therefore an object of the invention to provide an improved method of generation of synthetic seismograms for comparison with a real seismogram, whereby a better estimate of the accuracy of a hypothesized subterranean structure can be evaluated.

A further object of the invention is to provide a method for modeling subterranean structures of the earth which outputs a synthetic seismogram directly comparable to the real seismogram.

The ultimate object of the invention is to provide improved seismograms for exploration for oil, gas and other valuable minerals.

SUMMARY OF THE INVENTION

According to the present invention, synthetic seismograms are produced from a model in which the locations of the points at which the rays are to emerge from the earth is specified and the ray traced "backward". That is, the initial angles are not specified. Instead, the path along which a ray must travel in order to arrive at a predetermined detector location from the source is determined. This path can then be used to determine the time at which an output pulse would be detected at that location and its phase and amplitude relationship with respect to a specified input pulse determined, which can in turn be used to generate the synthetic seismogram without interpolation. In this way, even events which are not interpolable will still appear correctly on the synthetic seismogram, thus rendering it a more accurate and valuable tool in geophysical exploration.

BRIEF DESCRIPTION OF THE DRAWINGS

The invention will be better understood if reference is made to the accompanying drawings, in which.

DETAILED DESCRIPTION OF THE PREFERRED EMBODIMENTS

Figure 1:
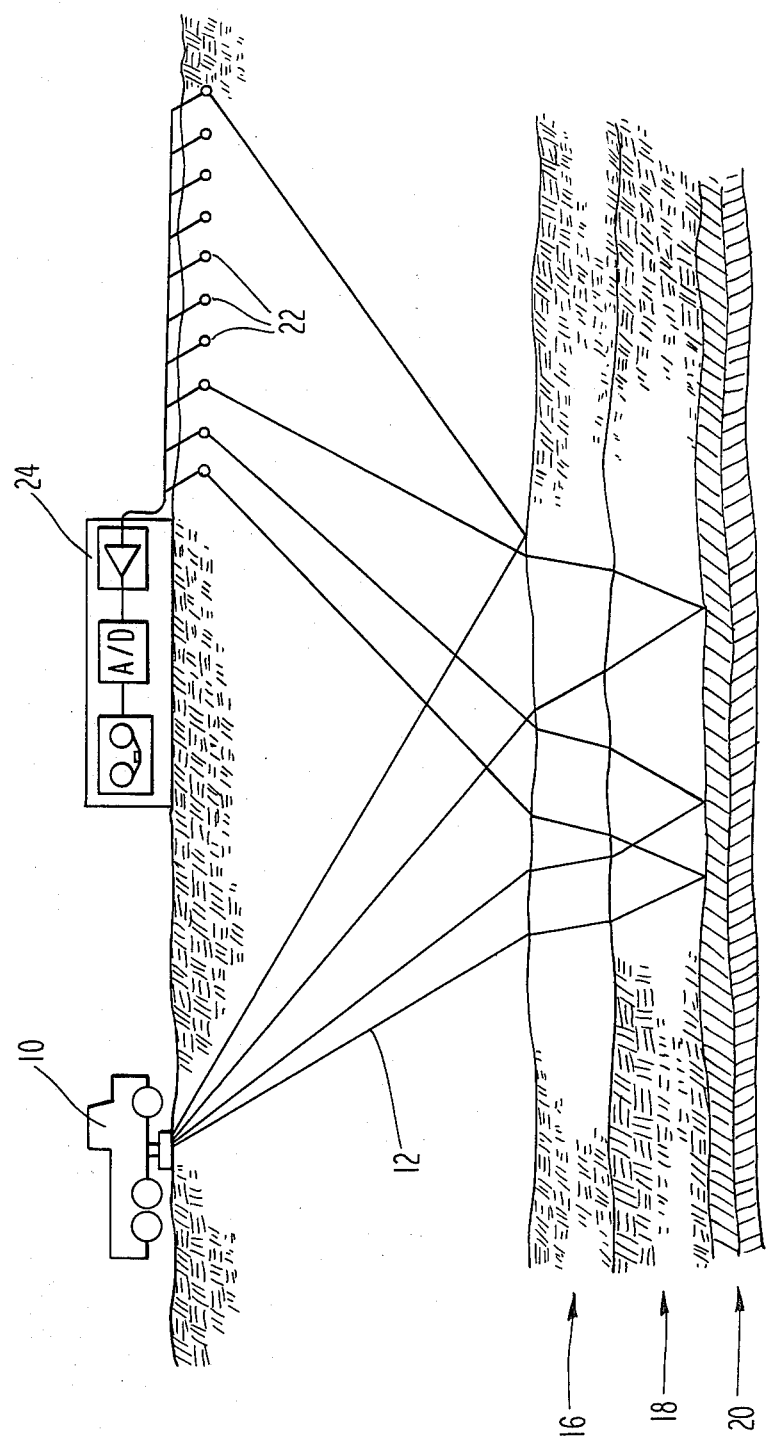
FIG. 1 shows the overall exploration set-up.

FIG. 1 shows an overall view of a seismic exploration system designed to yield a real seismogram. The method of the invention relates to means whereby an artifical seismogram can be generated for direct comparison with such a real seismogram in order to verify assumptions made about the subterranean structure of the earth.

Thus, in FIG. 1 an exploration vehicle 10 is shown as imparting acoustic waves indicated generally at 12 to the earth. The vehicle may comprise any of a wide variety of types now commercially available. In particular, it may comprise a vehicle for imparting an up and down motion to the earth, i.e., to generate a compressional wave or a side-to-side wave, a so-called "shear" wave. The techniques of the invention are equally applicable to both sorts of waves with appropriate adjustments made, as will readily be understood by those skilled in the art.

The seismic waves 12 travel downwardly in the earth and are reflected from one or more of a plurality of interfaces between rock layers indicated generally at 16, 18 and 20 to return upwardly to the surface of the earth where they are detected by a plurality of geophones 22. The signals output by the geophones are passed to a recording and processing unit 24 in which they may be amplified, converted to digital representations and stored on magnetic tape, all as well known to those skilled in the art. The processing of these signals is likewise well understood by those skilled in the art. In general what is done is that pluralities of signals which may be assumed to have been reflected from the same point on the interface between a pair of rock layers are corrected by scaling to compensate for the longer or shorter distances between the source and the detector and then are summed. This yields an improved signal-to-noise ratio in the signal. Corresponding signals are then, e.g., printed next to one another on a single piece of paper to yield a real seismogram. Where a plurality of signals indicate a deflection in amplitude of the geophone output all at about the same time from the imparting of acoustic energy from the earth, this may be taken to be representative of an interface between rock layers at a given distance beneath the surface of the earth. If enough such data is generated, a relatively detailed picture of the subterranean surface of the earth may be generated. That is, the subterranean structure of the earth may be mapped. Specific sorts of structures which are known to be conducive to the collection of oil or gas within the subterranean structure may be identified and wells drilled.

The seismic technique just described relies for its accuracy on the proper interpretation of the signals output by the geophones. Thus, for example, if a single acoustic wave its reflected from a plurality of interfaces in such a way that signals arrive out of order of depth, for example, due to multiple reflection from a single pair of interfaces, the picture is likely to be obscured. Accordingly, there have been developed techniques according to which a given hypothesized model is set up. The passage of an acoustic wave through this sequence of interfaces of layers is then mathematically modeled in accordance with known principles of acoustic wave propagation in a medium and a synthetic seismogram generated. If the synthetic seismogram agrees with the rear seismogram, it may then be assumed that the model corresponds relatively closely to reality. This technique has proven to be of interest and of utility in areas where the seismograms are not susceptible to ready interpretation. However, the modeling techniques which have previously been developed are sometimes inaccurate because they require interpolation from determined output points to points corresponding to locations of real geophones used in generation of the real seismogram, which steps are moreover expensive of computer time.

According to the present invention, the desired ray output points, i.e., points corresponding to actual geophone locations, are instead input to the program and the ray is traced backward to the source. An initial ray path angle is estimated, and used in accordance with Snell's law to determine the total ray path. If the detector spacing does not correspond to that of interest, the input angle is updated accordingly, and the process is repeated. When the input detector locations are achieved by the ray traced, the time of passage of the ray is determined and the input wave is time shifted accordingly. The process may then be repeated for other detector locations. When rays corresponding to all the actual detector locations have been so treated, a synthetic seismogram corresponding exactly to the real seismograms may be generated and compared to the actual field record. In this way, interpolation is eliminated and the inaccuracies inherent in an interpolative modeling method are likewise eliminated.

Figure 2:
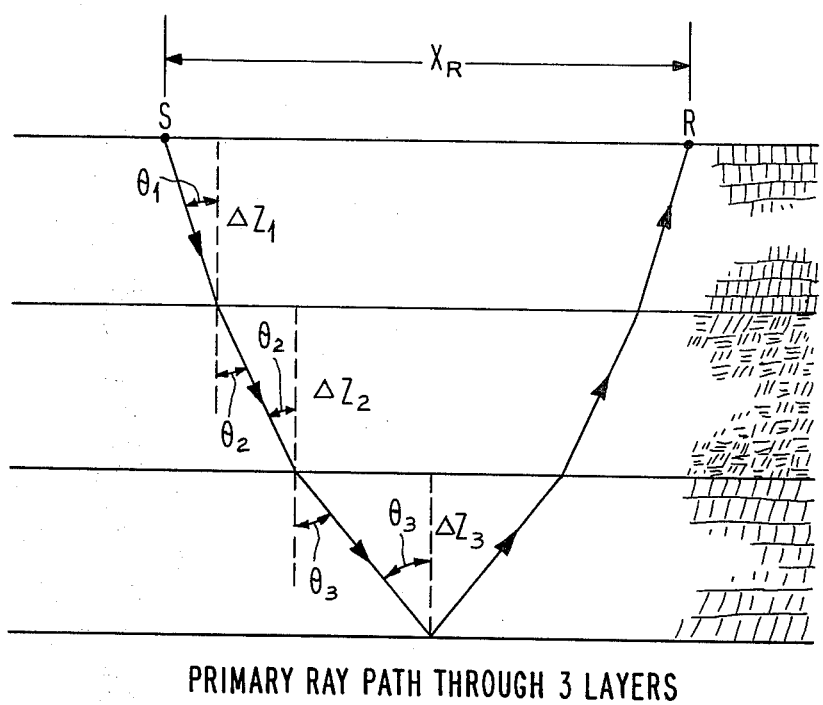
FIG. 2 shows a ray tracing model.

FIG. 2 shows a typical model ray path. The ray is emitted from a source S, passes through a plurality of rock layers, and is eventually received at a receiver location R. The distance between S and R is denominated $X_R$ in FIG. 2; hereinafter the distance between the source S and the ith receiver will be specified $X_i$. Similarly the thickness of the ith rock layer is denominated $\Delta Z_i$, while the angle the ray takes with respect to that layer is $\theta_i$. It will be appreciated that by definition of the velocity of the acoustic wave within each layer and given the thickness $\Delta Z_i$ of the layer, if the angle $\theta_i$ is determined, the time of passage of the wave through the ith layer can be determined. If the i times are summed, the total travel time of the wave between S and R can be determined and the input wavelet appropriately time shifted to yield a synthetic output record. If the calculations are reperformed a number of times with respect to a number of receiver locations $X_i$, the time shifted model input records can be output together to yield a synthetic seismogram. In turn, if the shot characteristics and source and detector locations are specified in accordance with a real exploration program and the model structure is specified in accordance with the structure believed to be the real structure of the earth at that location, the synthetic seismogram can be directly compared to the real seismogram for determination of the accuracy of the interpretation of the real seismogram, that is, for determination of the accuracy of the model.

Figure 5:
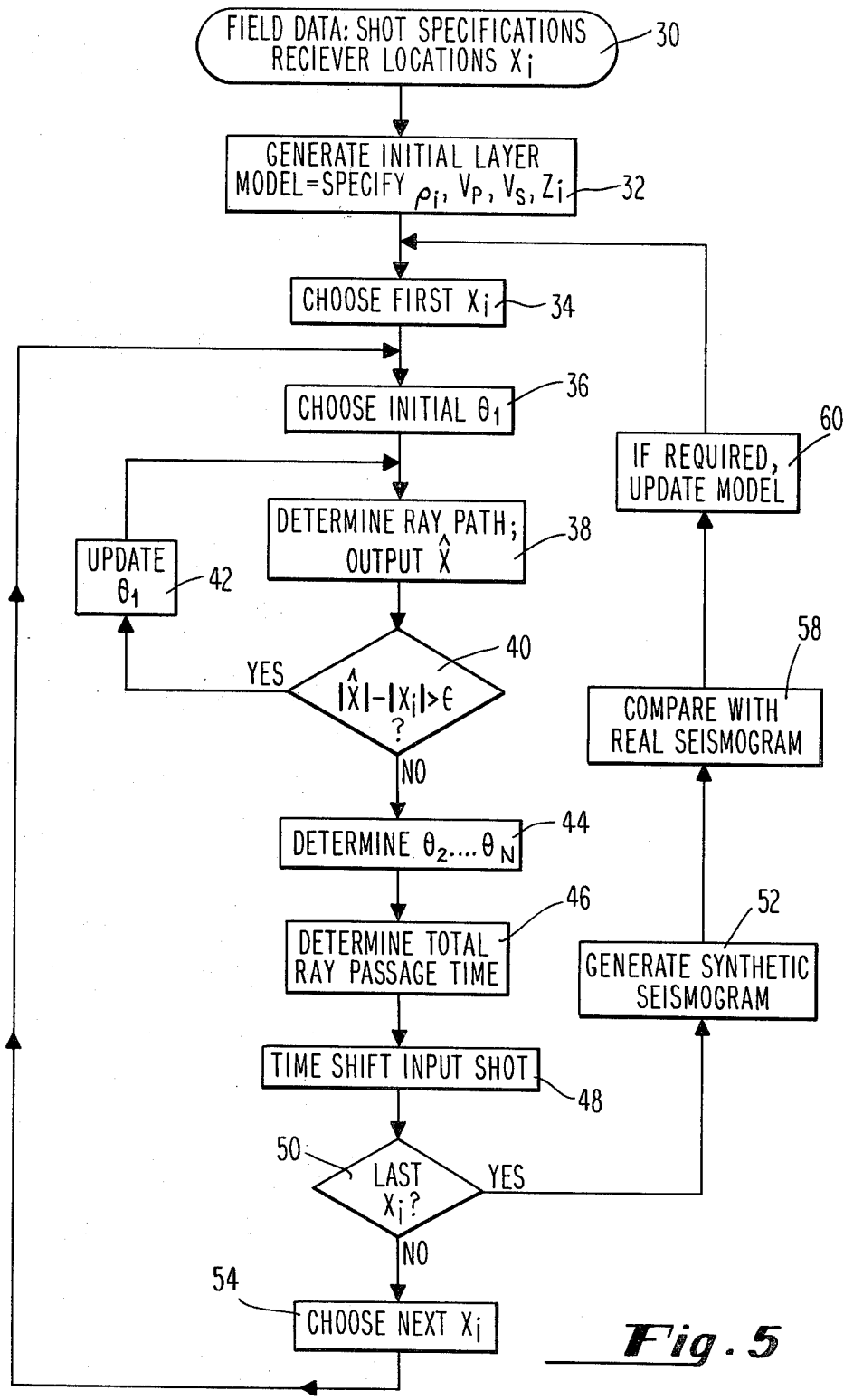
FIG. 5 shows a flowchart of the process of the invention.

FIG. 5 shows a flowchart of the process of the invention, by which an accurate model seismogram may be generated. From data recorded at the time of making of a real seismogram, shot specifications such as the frequency content of the input acoustic wave and the locations $X_i$ of the receivers with respect to the source are input, as at 30. An initial layer model structure is specified at 32 based on the interpretation of the real seismogram. It requires specification of the density $\rho_i$ and thickness $\Delta Z_i$ of each rock layer, together with an indication of the velocity of the compressional and shear waves in the layer, $V_p$ and $V_s$, respectively. A first source-to-receiver distance $X_i$ is specified at 34, as is an initial angle of incidence $\theta_1$ of the ray on the first rock layer interface, at 36. Using Snell's law as well as more advanced ray path modeling methods discussed in detail below, the total ray path is determined at 38 and an $\hat{X}$, that is, a determined source-to-receiver distance is output. The difference between $\hat{X}$ and $X_i$ is compared, as indicated at 40, to a specified maximum error value $\epsilon$. If $\hat{X}$ does not correspond closely to $X_i$, the initial incident angle $\theta_1$ of the ray is updated at 42 and the ray path recalculated. If their correspondence is sufficiently close, the remaining angles $\theta_2 \ldots \theta_n$ are calculated as at 44 and, using the wave velocity information previously input to the model, the total ray passage time is determined as indicated at 46. The input shot specified as then time-shifted at 48 in accordance with the total ray passage time calculated. Its shape may also be modified in accordance with its frequency content, again as discussed below. As indicated at 50, if the $X_i$ for which $\hat{X}$ was generated was the last, the time-shifted input shots may then be used to generate a synthetic seismogram as at 52. If not, the next $X_i$ is accessed as noted as 54 and the process repeated. The resultant synthetic seismogram may be compared with the real seismogram as noted at 58 and a measure of their correspondence made by eye or by use of known techniques. If the correspondence is inadequate, the model as noted at 60 is updated and the process repeated until an accurate synthetic seismogram is generated, which indicates that the model corresponds closely to the real subterranean structure of the earth in the region of exploration.

In a preferred embodiment, the modeling method according to the invention utilizes the techniques developed by Tooley, Spencer and Sagoci (TSS) in "Reflection and Transmission of Plane Compression Waves", *Geophysics*, Volume XXX, No. 4, pp. 552–570 (August, 1965) for generation of the reflection and transmission coefficients for plane acoustic waves incident on a plane boundary between homogenous isotropic media. These coefficients are dependent upon the angle of incidence, the density of each medium and on the relative velocities of the compressional and shear waves. Several assumptions are inherent in the use of these coefficients. First, that the incident wave is a plane wave. A point source, however, is theorized. Therefore, the wave approaches a plane wave only when the interface is a relatively long distance from the source. Furthermore, the derivation assumes that the media above and below the reflecting interface are at least semi-infinite in extent. In order for the results to be of interest, the modeling techniques must allow for at least some relatively thin layers. Nevertheless, the TSS model is the best presently available which takes angle of incidence into account; this is, of course, essential if it is to be possible to specify the output points corresponding to actual geophone locations. However, it should be understood that the invention is not dependent upon the use of the TSS model for the determination of the reflection and transmission coefficients. The procedure is so structured that any derivation of these coefficients known to those skilled in the art, may be used in practice of the method of the invention.

Theory

The foregoing can be better understood from the following description of the underlying theory. For convenience to those skilled in geophysical processing, a precise mathematical description is given below. It will be understood that while mathematical expressions are used to precisely define the various steps of the invention, these steps are physical steps which are performed on a digital processor and plotter or other apparatus commonly used in seismic processing. The terms "generating a model", "determining", "time-shifting", "producing a synthetic seismogram", and the like, as used herein, mean the operations performed on this apparatus.

In general, the amplitude of a compressional or P-wave, or of a shear wave (SV-wave) received at the surface will be dependent upon the material properties of all the layers. The amplitude of the reflected and transmitted P-or SV-waves in a particular interface are coupled to the amplitudes of waves at a neighboring interface by a matrix equation of the form $$\underline{A}_k = R_k \underline{A}_{k-1} \tag{1}$$

where $\underline{A}_k$ an $\underline{A}_{k-1}$ are four-vectors representing the P- and SV-wave reflection and transmission amplitudes at depths $Z_k$ and $Z_{k-1}$, respectively. $R_k$ is a $4 \times 4$ matrix containing material information on adjoining layers as well as propagation direction This is important because at any interface there will be both upcoming and downgoing waves of both P and SV modes. If $A_0$ represents the reflection and transmission amplitudes at the surface then $$\underline{A}_k = R_k R_{k-1} \ldots R_1 A_0 \tag{2}$$

gives the reflection and transmission amplitude at depth $Z_k$ provided the layer sequence terminates at some depth $Z_n$, and that below this depth there can be assumed to be a homogeneous half-space.

To construct a synthetic seismogram of the sort that would be observed at a receiver position at a distance $X_R$ from the source it is necessary to trace the contributing ray paths; that is, determine their geometry. In so doing, the present inventors have found that it is adequate to restrict oneself to the consideration of primary reflections only. Ray path determination will be based on two physical considerations: (1) when a ray is reflected from the surface, the angle of reflection must equal the angle of incidence; and (2) when a ray passes through an interface, it is refracted in accordance with Snell's law. That is, $$\frac{\sin \theta_1}{C_1} = \frac{\sin \theta_2}{C_2} \tag{3}$$

where $\theta_1$ is the angle of incidence in a medium of propagation velocity $C_1$, and $\theta_2$ is the angle of refraction in the medium of velocity $C_2$.

FIG. 2, discussed above, shows the typical ray path through three layers. The model shown has a layer-cake structure, i.e., all the interfaces are horizontal. It is found by the present inventors that this model is sufficiently general as to describe situations of real physical interest. Accordingly, the ray path is symmetrical with respect to the center, the point of reflection from the lowest interface considered, and hence it is only necessary to calculate half the total ray path $X_R$. Using the notation shown on FIG. 2, let us consider the ray path through these three layers for an example.

$$X_R/2 = X_1 + X_2 + X_3 \qquad (4)$$
$$= \tan\theta_1 \Delta Z_1 + \tan\theta_2 \Delta Z_2 + \tan\theta_3 \Delta Z_3$$

or since $$\tan\theta_i = \sin\theta_i/(1 - \sin^2\theta_i)^{\frac{1}{2}} \qquad (5)$$

we may write $$X_R/2 = \sum_{i=i}^{3} \frac{\Delta Z_i \sin\theta_i}{(1 - \sin^2\theta_i)^{\frac{1}{2}}} \qquad (6)$$

Now since $$\frac{\sin\theta_1}{C_1} = \frac{\sin\theta_2}{C_2} = \frac{\sin\theta_3}{C_3} \qquad (7)$$

we have $$\sin\theta_i = \frac{C_i}{C_1}\sin\theta_1 = \alpha_i \sin\theta_1 \text{ and} \qquad (8)$$

$$\frac{X_R}{2} = \sin\theta_1 \sum_{i=i}^{3} \frac{\alpha_i Z_i}{(1 - \alpha_i^2 \sin^2\theta_1)^{\frac{1}{2}}} \qquad (9)$$

For N layers, similar arguments lead to the more general expression $$\frac{X_R}{2} = \sin\theta_1 \sum_{i=i}^{N} \frac{\alpha_i Z_i}{(1 - \alpha_i^2 \sin^2\theta_1)^{\frac{1}{2}}} \qquad (10)$$

Apart from the special case where $N=1$ and $$\tan\theta_1 = \frac{X_R}{2\Delta Z_1} \text{ or } \theta_1 = \tan^{-1}\frac{X_R}{2\Delta Z_1}, \qquad (11)$$

Equation 10 is a non-linear equation in $\theta_1$. It is important to note, however, that if $\theta_1$ can be determined, the complete path geometry is determined, using Equation 7.

Thus, if we let $$F(\theta_1) = \sin\theta_1 \sum_{i=1}^{N} \frac{\Delta Z_i \alpha_i}{(1 - \alpha_i^2 \sin^2\theta_1)^{\frac{1}{2}}} - \frac{X_R}{2} \text{ and} \qquad (12)$$

$$F'(\theta_1) = \cos\theta_1 \sum_{i=1}^{N} \frac{\Delta Z_i \alpha_i}{(1 - \alpha_i^2 \sin^2\theta_1)^{\frac{1}{2}}} + \qquad (13)$$

$$\sin^2\theta_1 \cos\theta_1 \sum_{i=1}^{N} \frac{\Delta Z_i \alpha_i^3}{(1 - \alpha_i^2 \sin^2\theta_1)^{3/2}}$$

we can assume a trial value of $\theta_1$ and compute a correction factor $\delta\theta_1$ as $$\delta\theta_1 = \frac{-F(\theta_1)}{F'(\theta_1)}. \qquad (14)$$

One then replaces $\theta_1$ by $\theta_1 + \delta\theta_1$ and repeats the evaluation until $|\delta\theta_1| < \epsilon$ or, more appropriately in this case, until $|F(\theta_1)| < \epsilon$. The latter test provides a direct measure of how accurately the terminating point of the ray matches the specified receiver location $X_R$.

Those skilled in the art will recognize from Equation 12 that a path will be feasible only if all $(1-\alpha_i^2 \sin^2\theta_1) > 0$, $i=1, N$. A value of $(1-\alpha_i^2 \sin^2\theta_1) \leq 0$ means that the critical incidence angle has been exceeded at the ith interface, $i < N$, and there can be no complete path extending to the Nth interface. A complete path is still possible if the angle of incidence $\theta_N$ at the Nth interface exceeds the critical value. This condition will change the character of the reflection coefficient at the Nth interface but will not destroy the continuity of the path which penetrates only as far as the Nth interface.

In the practical implementation of this technique it is necessary to place some bounds on the allowable range of values for $\theta_1$ the initial ray path. If all of the $\alpha_i^2$ are $\leq 1.0$, it is sufficient to require that the $\sin^2\theta_1 < 1.0$. If, as is usually the case, some of the $\alpha_i^2$ are $> 1.0$ and $\alpha_j^2$ is $>$ all $\alpha_i$, $i \neq j$, $i=1, N$, then it is necessary to require that $\sin^2\theta_1 < 1.0/\alpha_j^2$. A suitable starting point value for $\theta_1$, $\overline{\theta}_1$, is $$\overline{\theta}_1 = \tan^{-1}\left(X_R/2 \sum_{i=i}^{N} \Delta Z_i\right) \qquad (15)$$

This is the starting angle of a straight line path from the source to the midpoint on the Nth layer. If the value of $\overline{\theta}_1$ thus obtained is such that $\sin^2 \overline{\theta}_1 > 1.0/\alpha_j^2$, we use a value of $$\overline{\theta}_1 = \sin^{-1}(0.99999\sqrt{1.0/\alpha_j^2}) \qquad (16)$$

We also require that $\theta_1 > 0.0$.

In discussing the generation of the signal observed at a specified receiver location we will first restrict ourselves to the case where all reflection coefficients are real. That is, we will require that the angles of incidence at all of the reflecting interfaces be less than the critical values. The formulation will later be generalized to include conditions where the reflection coefficients are complex. The transmission coefficients will always be real since we are dealing only with physically realizable paths.

Terminology definitions are described below. (In these definitions we will refer to the path which is reflected from the ith interface as the ith path. It should also be kept in mind that the reflection and transmission coefficients are functions not only of the angle of incidence but also of the physical properties of the model layers.)

Let $R(t)$ = time domain signal received at a specified receiver location.

$s(t)$ = signal applied at the source location.

$l_{ij}$ = length of the downward segment of the ith path in the jth layer.

$\tau_{ij}$ = downward travel time of the ith path in the jth layer = $l_{ij}/c_j$.

$T_{ij}$ = transmission coefficient for downward travel of the ith path through the jth interface.

$T'_{ij}$ = transmission coefficient for upward travel of the ith path through the jth interface.

$R_{ii}$ = reflection coefficient for the ith path at the ith interface. We may then express $R(t)$ in the form $$R(t) = \sum_{i=1}^{N} R_{ii} \left[ \prod_{j=1}^{i-1} (T_{ij}T'_{ij}) \right] s \left[ t - 2 \sum_{j=1}^{i} \tau_{ij} \right] \quad (17)$$

where $$\prod_{j=1}^{0} () = 1$$

Thus, for $N=1$ $$R(t) = R_{11} s(t - 2\tau_{11})$$

for $N=2$ $$R(t) = R_{11} s(t - 2\tau_{11}) + R_{22} T_{21} T'_{21} s[t - 2(\tau_{21} + \tau_{22})],$$

for $N=3$ $$R(t) = R_{11} s(t - 2\tau_{11}) + R_{22} T_{21} T'_{21} s \cdot [t - 2(\tau_{21} + \tau_{22})] + R_{33} T_{31} T'_{31} T_{32} T'_{32} s [t - 2(\tau_{31} + \tau_{32} + \tau_{33})]$$

In Equation (17) we have not included the customary spherical spreading correction. To include this effect, we must express R(t) in the form $$R(t) = \sum_{i=1}^{N} \left\{ R_{ii} \left[ \prod_{j=1}^{i-1} (T_{ij}T'_{ij}) \right] s \left[ t - 2 \sum_{j=1}^{i} \tau_{ij} \right] \left[ 2 \sum_{j=1}^{i} l_{ij} \right] \right\} \quad (18)$$

We must reemphasize that equation (17) or equation (18) is applicable only if all of the $R_{ii}$ are real, i.e., the angle of incidence at each reflecting surface is less than the critical value.

If, at any reflecting surface, the angle of incidence exceeds the critical value, the corresponding reflection coefficient will become complex and the reflected wave form will be distorted. If we express this complex reflection coefficient in the form $|R_{ii}| e^{k \delta_i}$ where $k = \sqrt{-1}$ it can be shown that it is necessary to replace the appropriate term(s)

$$R_{ii} \left[ \prod_{j=1}^{i-1} (T_{ij}T'_{ij}) \right] s \left[ t - 2 \sum_{j=1}^{i} \tau_{ij} \right] \quad (19)$$

In the summations of Equations (17) and (18) with term(s) of the form $$|R_{ii}| \left[ \prod_{j=1}^{i-1} (T_{ij}T'_{ij}) \right] S \left[ t - 2 \sum_{j=1}^{i} \tau_{ij} \right] \quad (20)$$

where $$S(t) = \cos(\delta_i) s(t) - \frac{2 \sin(\delta_i)}{\pi} \int_0^T \frac{s(\tau) \sin^2[\Omega_{max}(t - \tau)]}{(t - \tau)} d\tau \quad (21)$$

In Equation (21) it is assumed that $S(t) = 0$ for $t < 0$ and for $t > T$. The quantity $\Omega_{max}$ represents the upper limit to the frequency spectrum of the applied pulse. The value of $\Omega_{max}$ need not be known precisely, but should be such that there are no significant spectral components for $\omega > \Omega_{max}$.

The most important feature of Equation (21) is that the integral, which must be evaluated as a function of t, is dependent only upon the characteristics of the applied pulse s(t) Thus, it is necessary to determine the integral values only one time even if there is more than one reflecting surface for which the reflection coefficient is complex. Since it is possible for the integral to have significant values for t-values outside of the range $0 \leq t \leq T$, it is necessary to evaluate S(t) over a broader time range, e.g., $-nT \leq t \leq nT$. This must be done to insure that all significant contributions of S(t) are included in the synthetic trace.

In a preferred embodiment, these integral values are calculated in tabular form, one time only, the first time that this critical angle condition obtains. Values of S(t), as needed, are then determined from the computed values of $\delta_i$ and by interpolation in this integral value table. In most cases we have found that a value of $n = 2$ is large enough to insure a proper representation of s(t).

EXAMPLES

As a first example of the application of the method of the invention, consider the simple 4-layer model illustrated in Table I. In this table, the values of Z appearing on the right indicate the depths of the interfaces between the subterranean rock layers modeled, while the values of $\rho$ are densities within the layers, and $V_p$ and $V_s$ represent compressional and shear wave velocities, respectively.

TABLE I

| FOUR LAYER MODEL | | |
|---|---|---|
| $\rho = 2.28$; | $v_p = 7900$ | $z = 0$ |
| | $v_s = 4157.9$ | |
| $\rho = 1.90$; | $v_p = 8130$ | $z = 5300'$ |
| | $v_s = 3946.6$ | |
| $\rho = 2.09$; | $v_p = 8500$; | $z = 5600'$ |
| | $v_s = 4829.5$ | |
| $\rho = 2.12$; | $v_p = 9100$ | $z = 5700'$ |
| | $v_s = 4918.9$ | |
| $\rho = 2.28$; | $v_p = 8000$ | $z = 6000'$ |
| | $v_s = 4210.5$ | |

Figure 3:
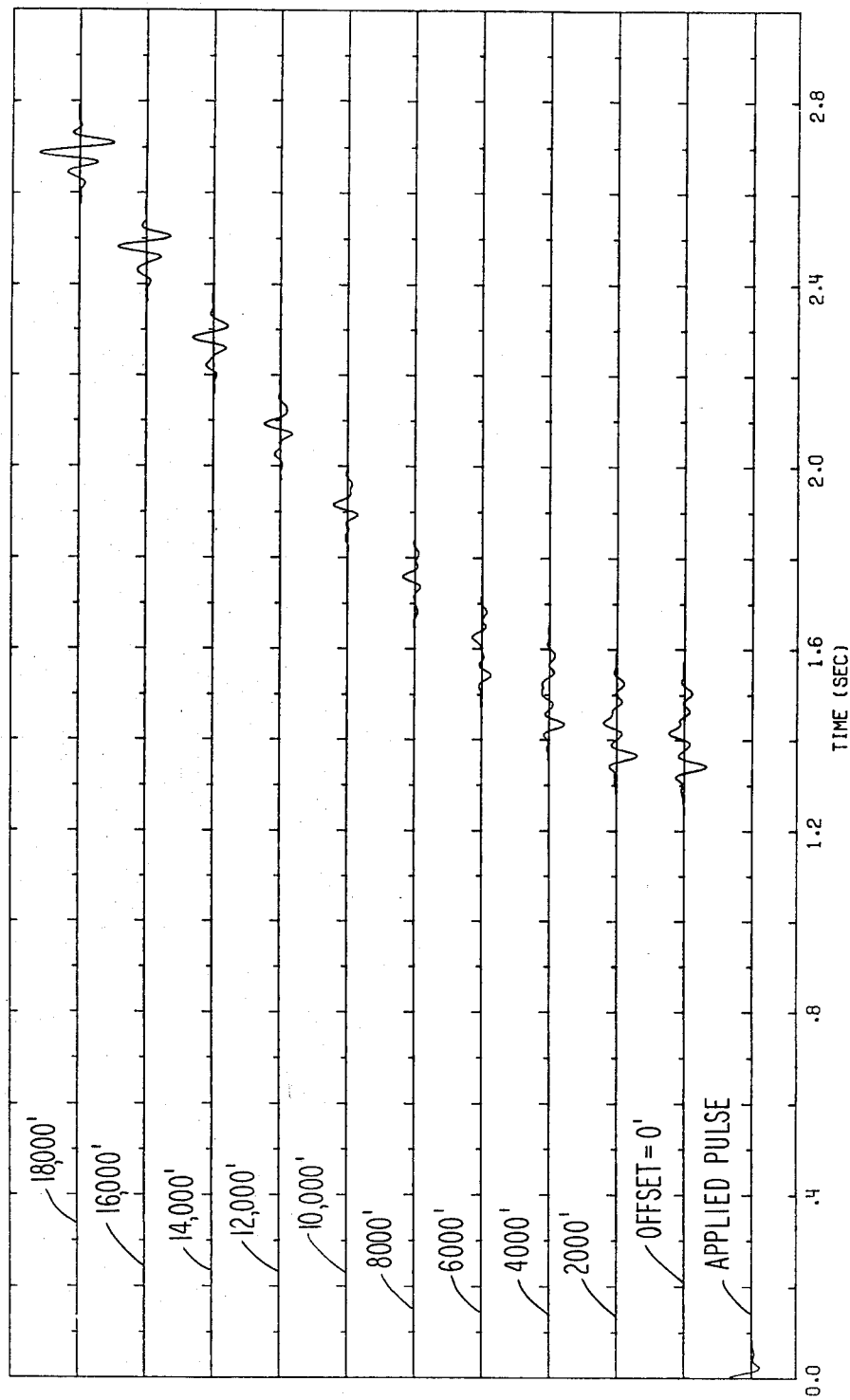
FIG. 3 shows a typical output plot.

We apply a zero phase 2-8-20-40 wavelet with a cosine tapper—i.e., one in which 95% of the energy is between 8 and 20 Hz, with a cosine function applied to the "tails" below 2 and above 40 Hz to ensure their equaling zero—and generate the traces that would be recorded at receiver locations from $X = 0.0$ to $X = 18,000$ feet in offset increments of 2,000 feet. The resultant traces are shown in FIG. 3. In this Figure, all traces are normalized on the $X = 0$ trace. It will be apparent from this Figure that there are significant alternations in the character of the received signal as the receiver is moved away from the source. There are two phenomenon contributing to these changes. The first, and perhaps most significant for this model, are the changes of the reflection and transmission coefficients, $R_{pp}$ and $T_{pp}$, with the angle of incidence. These coefficients, of course, also depend on the relative densities of the two rock layers of any given interface. Such an effect would be missed in the prior art interpolative technique if the points used were, for example, 4000 and 12,000 feet, between which the signal is quite weak. The second is, as is well known, that the arrival times for the separate events tend to merge together with increasing offset.

Reflection coefficients for this model and offset range are summarized in Table II.

TABLE II
REFLECTION COEFFICIENTS FOR THE 4-LAYER MODEL

| OFFSET (FEET) | $R_{pp}$ | | | |
|---|---|---|---|---|
| | PATH 1 | PATH 2 | PATH 3 | PATH 4 |
| 0 | −.07666 | .06979 | .04121 | −.02803 |
| 2,000 | −.07074 | .06228 | .04137 | −.02564 |
| 4,000 | −.05502 | .04240 | .04236 | −.02001 |
| 6,000 | −.03397 | .01623 | .04539 | −.01477 |
| 8,000 | −.01157 | −.01020 | .05202 | −.01387 |
| 10,000 | .00996 | −.03286 | .06408 | −.02050 |
| 12,000 | .02995 | −.04963 | .08418 | −.03719 |
| 14,000 | .04857 | −.05956 | .11693 | −.06649 |
| 16,000 | .06632 | −.06201 | .17260 | −.11183 |
| 18,000 | .08378 | −.05608 | .28128 | −.17822 |

At zero offset, for example, the reflection coefficient at the first layer is negative and is the largest in absolute magnitude of the four contributing coefficients. Thus, as is shown in FIG. 3, the first event is the strongest. However, as we move away from the source, this reflection coefficient diminishes in magnitude, passes through zero, and then gradually increases again in magnitude. Corresponding to these changes, we observe in FIG. 3 that this first event diminishes in amplitude with increasing offset, has practically vanished at 10,000 feet, and then reappears with opposite polarity again increasing in amplitude with offset. The most dramatic change in reflection coefficients is for path 3, i.e., reflection from the third interface at 5700 feet. Here there is no sign change, but the value of $R_{pp}$ increases steadily from 0.04 at zero offset to 0.28 at 18,000 feet. Thus, as the receiver is moved far from the source, the third event becomes the most prominent feature of the trace. These changes are apparent from the change in shape of the received wavelet.

It should be emphasized that for the traces shown in FIG. 3 all of the values of $R_{pp}$ are real. That is, for this model and range of offset values, there is no path requiring an angle of incidence in excess of the critical value. It is evident from this example that critical angle conditions are not necessary to produce complex reflection patterns. The presence of such conditions will only serve to further complicate an already complex situation.

Arrival times for the four primary reflection ray paths for this model are summarized in Table III.

TABLE III
ARRIVAL TIMES FOR THE 4-LAYER MODEL

| OFFSET (FEET) | ARRIVAL TIME (SECONDS) | | | |
|---|---|---|---|---|
| | PATH 1 | PATH 2 | PATH 3 | PATH 4 |
| 0 | 1.3418 | 1.4156 | 1.4391 | 1.5050 |
| 2,000 | 1.3655 | 1.4380 | 1.4611 | 1.5258 |
| 4,000 | 1.4341 | 1.5031 | 1.5251 | 1.5864 |
| 6,000 | 1.5418 | 1.6059 | 1.6262 | 1.6825 |
| 8,000 | 1.6810 | 1.7396 | 1.7580 | 1.8084 |
| 10,000 | 1.8446 | 1.8977 | 1.9142 | 1.9584 |
| 12,000 | 2.0267 | 2.0746 | 2.0893 | 2.1272 |
| 14,000 | 2.2228 | 2.2660 | 2.2789 | 2.3106 |
| 16,000 | 2.4295 | 2.4684 | 2.4797 | 2.5054 |
| 18,000 | 2.6442 | 2.6793 | 2.6891 | 2.7087 |

If we compare the arrival times for paths 1 and 4 at zero offset and at a receiver 18,000 feet from the source we see that the separation of these two events decreases from an initial value of 0.1632 seconds to a value of 0.0645 seconds. Similarly, the separation of events 1 and 3 decreases from 0.0973 seconds to 0.0449 seconds. As the events merge together in this manner, there is interference or overlapping of the wavelets which further complicates the shape of the observed signal.

Figure 4:
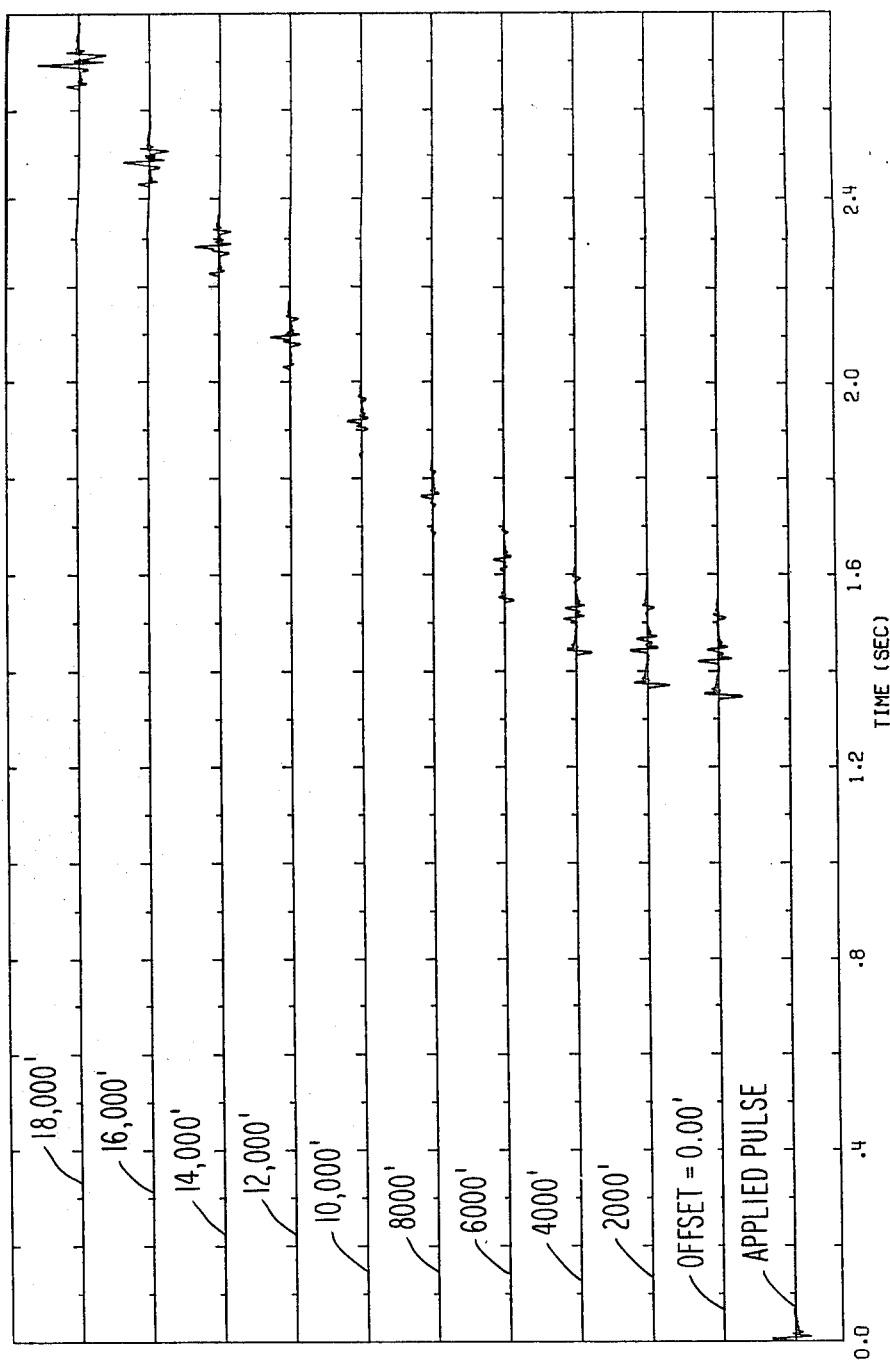
FIG. 4 also shows a typical output plot, but having different input conditions from FIG. 3.

To illustrate the versatility of the method of the invention, FIG. 4 shows the results obtained for the same model and offset sequence when a higher frequency, more sharply defined minimum phase pulse, 1-10-100-150, is specified as a source. Here, because the pulse is much sharper, there is less interference of events. The amplitude variations are, of course, equivalent to those previously shown in FIG. 3 for the lower frequency pulse.

Those skilled in the art will recognize that the synthetic seismograms shown in FIGS. 3 and 4 may be directly compared to seismic records output by geophones placed on the earth. If the records are closely comparable, it may then be assumed that the model chosen is a good representation of the subterranean structure; the method of the invention, comprising as it does selecting predetermined points at which the synthetic seismic waves would be received, provides a direct comparison between the synthetic seismogram and a real seismogram recorded with respect to geophones located at such predetermined points, without the necessity of interpolation. This in turn renders the synthetic seismograms of greater accuracy inasmuch as any events which might tend to be obscured by the interpolation process are thus not lost. If the synthetic and real seismograms do not closely correspond, the model may be modified and the process reperformed, as indicated in FIG. 5 and the discussion thereof.

One example of a computer system which is suitable for use in practice of the method of the invention is supplied by Control Data Corporation and includes a Cyber 175 central processor with one or more peripheral processors, extended core storage, tape drives and Statos and Calcomp plotters. The specific programming required will be apparent from the foregoing, and from the users' manual for the particular computer system used.

It will likewise be appreciated that there are numerous modifications and improvements which can be made to the method of the invention and that accordingly the above description is to be considered merely exemplary of the invention and not as a limitation on its scope, which is as defined by the following claims.

We claim:

1. Method for exploring the subterranean structure of the earth comprising the steps of:

imparting acoustic energy to the earth at a first shot point location;

detecting return of said energy at a plurality of detector locations;

generating a real seismogram using the outputs of said detectors;

generating a model of the subterranean structure of the earth based on said real seismogram, said model including definition of rock layers as to thickness and the velocity of acoustic waves therein;

determining the paths of plural model acoustic rays corresponding to said acoustic energy through said model structure with ray path terminations defined to be located at points chosen to correspond to said detector locations;

determining the time required for a ray to pass along the determined paths of said model acoustic rays;

time-shifting said model rays in accordance with said determinations of time;

producing a synthetic seismogram exhibiting the results of said time-shifted operations; and comparing said synthetic seismogram and said real seismogram to yield a result indicative of the accuracy of said model.

2. The method of claim 1 comprising the additional step of updating said model and producing an updated synthetic seismogram based thereon until the result indicative of the accuracy of the model indicates substantial accuracy.

3. Method of mapping subterranean structures comprising the steps of:

arranging plural detectors of acoustic waves in a predetermined pattern on the surface of the earth;

imparting an acoustic wave to the earth at a shot point;

recording signals output by said detectors upon receipt of said acoustic wave by said detectors after reflection from said structures;

providing a representation of said recorded signals, in which successive ones of said signals are spaced from one another on said representation by distances proportional to said predetermined pattern of detectors on the surface of the earth;

determining the paths of a model acoustic wave corresponding to said acoustic wave input to a model structure of the earth at a first point corresponding to said shot point and emerging at plural locations corresponding to said predetermined pattern of detectors, said model structure chosen in accordance with said representation of said recorded signals;

determining the times required for said wave to traverse said paths;

time-shifting said model wave in accordance with said determination of times;

generating a representation of the results of said time-shifting comparable to said representation of said recorded signals; and comparing said representations, whereby the identity therebetween is indicative of the accuracy of said mapped structure of the earth.

4. The method of claim 3 comprising the additional step of modifying said mapped structure and said model structure and iteratively reperforming said confirmation operation until the identity between said representations is acceptable.

5. Method of generating a synthetic seismogram, comprising the steps of:

(a) generating a model of the subterranean structure of the earth, by defining a sequence of subterranean rock layers by their respective thickness and the velocity of an acoustic wave therein, said model corresponding to a real subterranean structure identified by examination of a real seismogram produced from an acoustic wave generated and detected by at least one source and detector positioned over said subterranean structure;

(b) generating a signal representating the frequency content of a model acoustic wave;

(c) defining the starting and terminating points of model paths for said model wave, said defined terminating point being defined in accordance with the position of said at least one detector;

(d) inputting an initial angle of incidence of said wave on a first one of said layers;

(e) determining the remainder of said path beginning at said starting point, to yield a determined terminating point;

(f) comparing said determined terminating point with said defined terminating point, and if their difference is excessive redefining said first angle of incidence and reperforming steps (d) through (f), to minimize said difference;

(g) determining the time of passage of said wave between said defined starting and terminating points;

(h) time-shifting said signal representing said wave by the time of passage determined;

(i) modifying said defined terminating point of said model path and reperforming steps (d) through (i); and (j) upon conclusion of reperformance of steps (d) through (i), plotting a record of the time-shifted signals representing said model acoustic waves.

6. The method of claim 5 wherein said initial angle of incidence is defined such that a straight ray path extending at said initial angle to said sequence of layers would be incident on the lowermost of said layers at a point midway between said defined starting and terminating points.

7. In a method of generating a synthetic seismogram comprising the steps of defining an initial angle of incidence of a defined acoustic wave on a model of the structure of the earth and tracing the path of said wave to an output point, the improvement which comprises iteratively modifying said initial angle and reperforming said tracing until said output point corresponds to a predetermined detector means output point, whereby said synthetic seismogram may be directly compared with a real seismogram generated by use of detector means located at a point corresponding to said predetermined output point.

8. The method of claim 7, wherein said model is modified, and an updated synthetic seismogram produced in response to said comparison.

9. In a method of generating a synthetic seismogram comprising the steps of defining a model subterranean structure of the earth and tracking the path of a model acoustic wave through said structure, the improvement comprising defining starting and ending points to said path, said ending point corresponding to a predetermined receiver location, determining an initial angle of incidence of said wave on said structure, tracing said path through said structure to determine an output endpoint to said path, comparing said output endpoint to said defined ending point, and iteratively modifying said initial angle of incidence and reperforming said steps of tracing and comparing until said output endpoint and said defined ending point are substantially equal, and then calculating the time of passage of said model wave along the determined path, and time-shifting said model wave by said time of passage to produce a synthetic seismogram.

* * * * *

UNITED STATES PATENT AND TRADEMARK OFFICE
CERTIFICATE OF CORRECTION

PATENT NO. : 4,415,999
DATED : November 15, 1983
INVENTOR(S) : GEORGE P. MOECKEL & GEORGE C. WALLICK It is certified that error appears in the above-identified patent and that said Letters Patent are hereby corrected as shown below:

Col. 3, line 64, "its" should read --is--.

Col. 4, line 7, "rear" should read --real--.

Col. 5, line 30, before "54" insert --at--.

Col. 6, line 34, "$A_0$" should read --$\underset{\sim}{A}_0$--.

Col. 7, line 54, in equation (13), "F" should read --F'--.

Col. 7, line 64, in equation (14), "F", in the denominator, should read --F'--.

Col. 9, between the equation for "N=3", at lines 20-24 and line 24, insert --etc.--.

Col. 10, line 46, "tapper" should read --taper--.

Col. 10, lines 54 and 55, "alternations" should read --alterations--.

Signed and Sealed this

Nineteenth Day of June 1984

[SEAL]

Attest:

GERALD J. MOSSINGHOFF

Attesting Officer   Commissioner of Patents and Trademarks